W. L. NICOLS.
PORTABLE SCAFFOLD.
APPLICATION FILED APR. 3, 1919.

1,364,791.

Patented Jan. 4, 1921.
2 SHEETS—SHEET 1.

Witness
C. VAN DEN BERG.

Inventor
WILLIAM L. NICOLS.
By
Attorney

W. L. NICOLS.
PORTABLE SCAFFOLD.
APPLICATION FILED APR. 3, 1919.
1,364,791.
Patented Jan. 4, 1921.
2 SHEETS—SHEET 2.
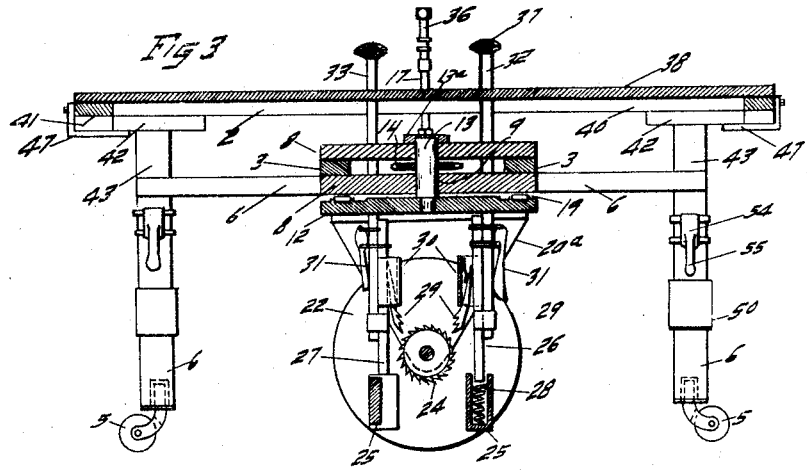
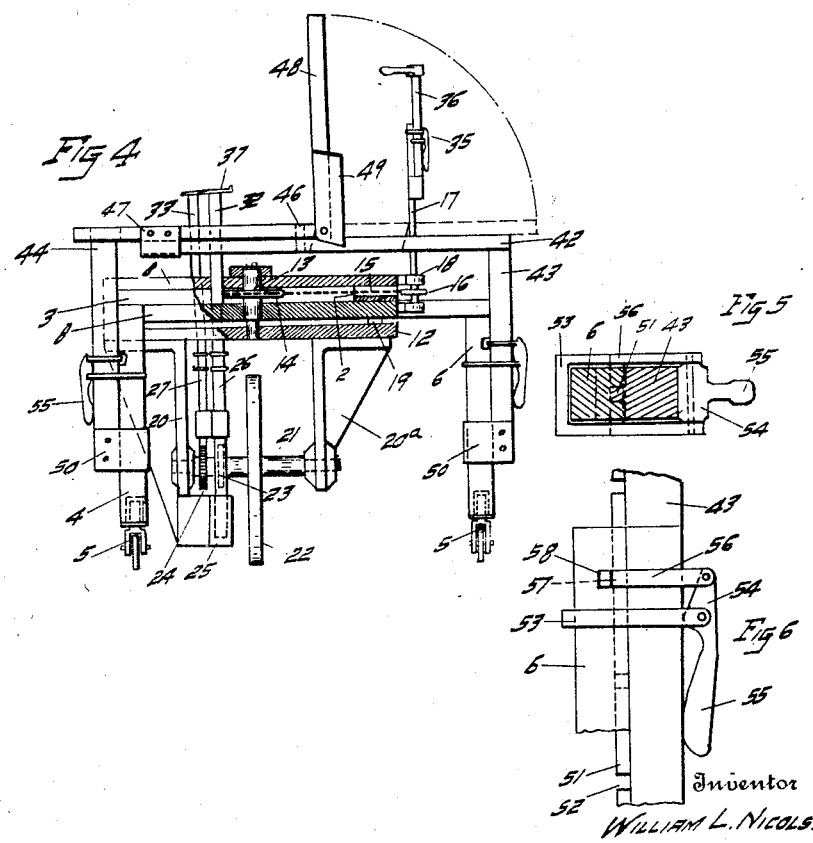
Inventor
WILLIAM L. NICOLS.
Witness
C. VANDEN BERG.
By
Attorney

UNITED STATES PATENT OFFICE.

WILLIAM L. NICOLS, OF TUSCUMBIA, ALABAMA.

PORTABLE SCAFFOLD.

1,364,791.  Specification of Letters Patent.  Patented Jan. 4, 1921.

Application filed April 3, 1919. Serial No. 287,353.

*To all whom it may concern:*

Be it known that I, WILLIAM L. NICOLS, a citizen of the United States of America, residing at Tuscumbia, in the county of Colbert and State of Alabama, have invented certain new and useful Improvements in Portable Scaffolds, of which the following is a specification.

My invention relates to a portable scaffold especially designed and adapted for the convenient use of workmen such as plasterers, paperers, painters and the like, its object being to provide an apparatus which can be moved by the workman thereon in any direction which the work may require and which is of such shape and construction that it can be readily transported and adjusted to different elevations and which is capable of being contracted so that it can be passed through the ordinary door or window openings of buildings.

It is a desirable feature of my invention that the scaffold may be propelled by a foot power so as to leave the workman's hands free for other work.

My invention is characterized by the provision of a sub-frame mounted on casters and provided with a turn-table which carries a tractor wheel and above this sub-frame is adjustably mounted a platform for the operator, suitable means being provided for the guiding and operation of the tractor wheel by the operator on the platform.

It is a further distinctive feature of my invention that a portion of the platform and part of the sub-frame are adjustable so that the scaffold can be collapsed sufficiently to permit it to pass readily through doorways after which it can be expanded again to provide ample working space on the platform.

My invention comprises the various details of construction and arrangements of parts, which, in their preferred embodiment only, are illustrated in the accompanying drawings which form a part of this specification, and in which:—

Fig. 3 is a vertical transverse sectional view taken on the line 3—3 of Fig. 1.

Fig. 4 is a side elevation of Fig. 1 with the front platform extension raised and the turn-table and center plates broken away.

Figs. 5 and 6 are detail views of the clamps in plan and side elevation for adjusting the platform supports on the sub-frame.

Similar reference numerals refer to similar parts throughout the drawings.

Figure 1:
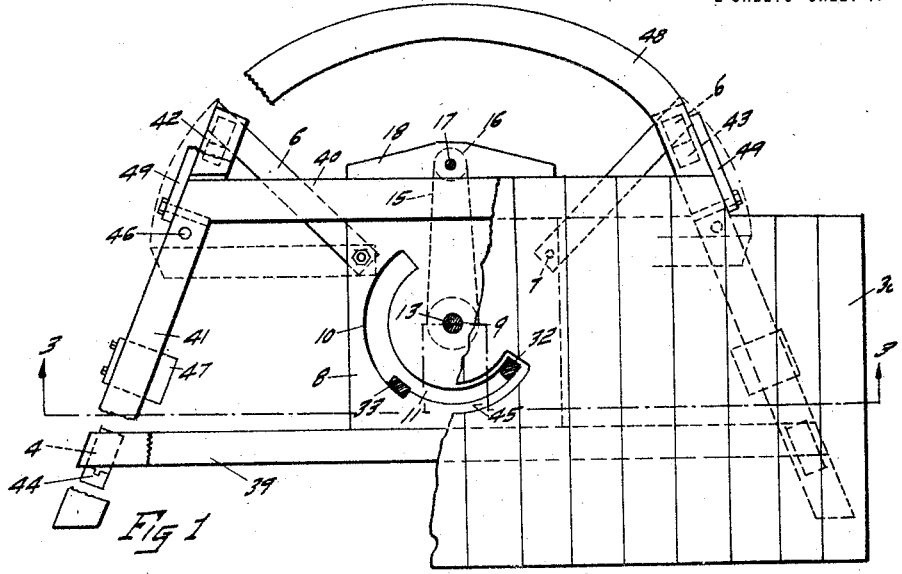
Figure 1 is a top plan view of the portable scaffold expanded to full operating condition with part of the scaffold broken away to show the mechanism thereunder in plan.
Figure 2:
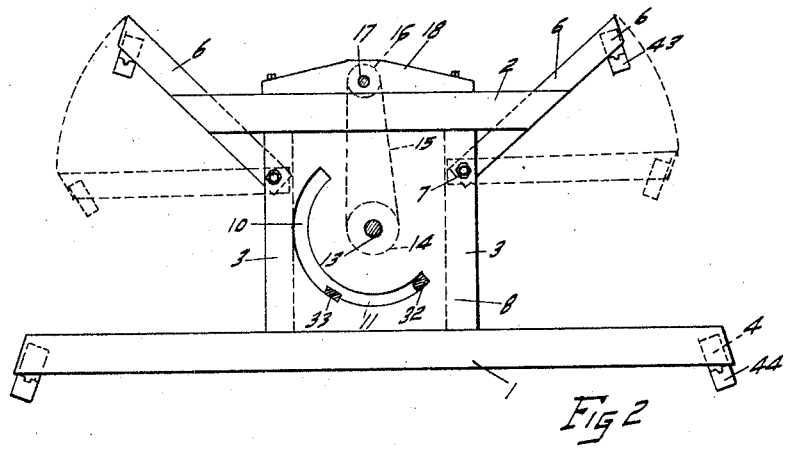
Fig. 2 is a plan view of the sub-structure of the scaffold, the view being taken with the top platform removed.

In the preferred embodiment of my invention illustrated in the drawings, the sub-frame shown in plan view, Fig. 2, comprises a front cross bar 1 and a shorter rear cross bar 2 rigidly connected by the spaced bars 3. At the ends of the front bar 1 I rigidly attach leg members 4 provided with casters 5 which are typical of any roller supports therefor. Pivoted in notched portions of the side bars near the bar 2 are rear legs 6, these being secured to the under side of the bar 3 by a pivot 7 and adapted to swing to a rear position under the outer overhung ends of the rear bar 2 when the sub-frame is in extended position, and when the frame is contracted these legs are swung into the dotted line position shown in Fig. 2. Casters 5 are provided for these legs 6. Duplicate slotted center plates 8 are attached above and below to the cross bars 3, being secured rigidly to the bars by bolts, or other like means, and these plates are provided with alining center openings 9 and with registering curbed slots 10, which have each a narrower slot extension 11, the slots 10 and 11 being concentric with the holes 9. A turn-table 12 having fast in its center a shank 13 is mounted under the center boards 8 with its shank turning in the alining openings 9 as bearings therefor. Fast on the shank between the plates 8 is a sprocket wheel 14 about which passes a sprocket chain 15 which passes through a suitable notch in the rear bar 2 and about a sprocket wheel 16 on a steering shaft 17 which is mounted in step bearings 18 attached to the plates 8. The turn-table has on its upper face a series of antifriction rollers 19 which bear against the lower plate 8 and permit the turn-table to swing freely about under the load of the scaffold. Attached to the underface of the turn-table is a pair of brackets 20 and 20ᵃ which are provided with journal bearings near their lower ends for the shaft 21 upon which a tractor wheel 22 is fast, the shaft also carrying fast thereon a pair of ratchet wheels 23 and 24 which have their ratchet teeth reversely disposed. At the foot of the bearing bracket 20 adjacent to the ratchet wheels I provide bottom guides 25 for the driving rods 26 and 27, these guides serving to house springs 28 which normally hold the driving rods in elevated position. When in this position the spring-pressed pawls 29 carried by the driving rods are disposed above their respective ratchet wheels. These pawls are pivotally mounted in housings 30 attached to each driving rod and the upper ends of these rods when raised will abut against the turn-table. Attached to the driving rods by clamps 31 are pedal bars 32 and 33 which slide freely through holes provided for them in the turn-table and are movable therewith through the alining slots 10 and 11 in the center plates 8. As will be seen more clearly in Fig. 1, the pedal 33 works in the enlarged slot 10 while the pedal 32 works in the smaller slot 11, and this view will show clearly how these pedal bars are relatively offset so as to stand in line with their respective ratchet wheels. The pedal bars are of such length as to be capable of considerable vertical adjustment relative to the driving rods 26 and 27 to which they are respectively clamped. The steering shaft 17 is connected by a clamp 35 to an extension handle shaft 36 which is vertically adjustable on the shaft 17. Each of the pedal bars is provided at its upper end with a foot pedal 37.

The apparatus as thus far described comprises the sub-frame and the mechanism for steering and propelling the sub-frame on its caster supports.

In order that the apparatus may be adjusted to different working levels, I provide a top platform 38 shown broken in the plan view of Fig. 1. This platform is supported on a frame-work comprising a front cross member 39 and a rear cross member 40 rigidly connected by converging side bars 41 which extend an appreciable distance to the front of the cross member 39. At the rear ends of each side bar 41 I provide a pivoted extension member 42 forming in effect a rear continuation of the bar and these are intended to be engaged and supported by extension legs 43 adjustably connected to the vertical members of the swinging legs 6, see Fig. 4. The front cross member 39 is adapted to be supported at its ends by extension legs 44 adjustably connected to the front legs 4. The platform is provided with a slot 45 registering with the slots 10 and 11 so as to permit the pedals 33 and 34 to pass upwardly therethrough and extend above the platform. The extension members 42 are pivoted to the side members 41 by pins 46 disposed near the center of each bar 42, thus permitting their forward ends to swing into sockets formed by a bent metal bar 47 attached near the forward end of each side member 41, as will be more clearly seen in Fig. 3. These sockets serve to stop the swinging movements of the bars 42 when they come into alinement with the side members 41 and they also form a strong connection between their forward ends and the frame members 41. By swinging the rear ends of the members 42 outward they will assume the dotted line position substantially above the dotted position of the leg 6 in Fig. 2, thus contracting the depth or width of the scafford to such size that it can be readily passed edgewise through a door.

In order to extend the platform to increase the operating space thereon, I hinge an extension member 48 to the rear ends of the side members 41 by means of side straps 49, these straps dropping below the top level of the platform extension 48 and embracing the sides of the bars 41, as will be seen more clearly in Fig. 4. This pivotal attachment permits the extension member 48 to be swung upwardly above the steering handle 36 and to assume the full line position shown in Fig. 4, which position is given the extension when the scaffold is contracted. This extension platform may be used for increasing the zone of movement of the operator or for supporting the material to be used or for any other purpose.

The means for adjustably connecting the legs 4 or 6 to the vertically adjustable extension legs 43 and 44 is shown in detail in Figs. 5 and 6, and comprise a bottom guide 50 connected to the lower end of each extension leg 43 and 44 and adapted to slidably embrace the legs 4 or 6. The edges of the legs 4 or 6 engaged by the sliding extension legs are grooved and each extension leg is provided with a tongue 51 working in the groove and provided with notches 52 at suitably spaced intervals. Near the upper end of each leg 4 or 6 is attached a bearing yoke 53 in the outer end of which a cam 54 is pivotally mounted. The cam has at its lower end a handle 55 and its upper end is connected to a clamp yoke 56 which embraces the extension member. When the cam handle is forced downwardly against the leg 4 or 6, the yoke draws the extension member firmly to its respective leg and the notches in the extension leg rib will be forced into the cross bar 57 which connects the ends of the yoke 56 and passes through a slot 58 in each leg 4 or 6. The slot is disposed to leave the bar 57 projecting into the groove in the leg.

In operation, having assembled the scaffold in the manner described and adjusted the height of the working platform to the level required for the work, the operator stands on the platform and proceeds with the work, guiding the scaffold from point to point by moving the steering handle 36 and depressing the forward or backward driving pedals to thereby turn the tractor wheel and move the scaffold which is supported almost entirely by the tractor wheel and is balanced by its marginal casters. The steering and tractor wheel and its turn-table are adjustable through an arc of 90°, the slots 10 and 11 permitting the pedals to move therethrough with the angular movement of the turn-table. By having the forward and reverse drive to the tractor wheel, the adjustment of the latter through a 90° angle will enable the scaffold to be moved in any direction. To collapse the scaffold, the platform extension 48 is swung upwardly to full line position, Fig. 4, the legs 6 are swung to dotted line position, Fig. 2, the extension bars 42 are swung parallel to the cross bar 40, thus reducing the width of the scaffold to the main frame proper. The particular propulsion means employed may be widely varied and I do not desire to limit myself to the particular shape of the sub-frame or the platform, or to the particular adjusting clamps for the platform supports, as these several parts may be varied to meet different operating conditions without departing from the spirit of my invention.

The legs and frames may be braced in any practicable manner and constructed of any suitable material.

This invention is not intended to be restricted in scope to the specific embodiments shown, but contemplates such modifications as come within the spirit and scope of the claims.

What I claim as new and desire to secure by Letters Patent, is:—

1. In a portable scaffold, a centrally disposed tractor wheel, marginal casters on the scaffold surrounding the wheel, a steering frame in which the wheel is mounted in position to support a substantial part of the scaffold load, and means to operate the wheel to propel the scaffold.

2. In a portable scaffold, a frame having a platform and casters at its sides, a centrally disposed tractor wheel about which the scaffold balances, and means to steer and propel the tractor wheel on said platform.

3. A portable scaffold of the character described comprising a roller supported frame having a substantially centrally disposed turn-table connected thereto, a tractor wheel mounted centrally on the turn-table and adapted to engage the floor, and mechanism on the scaffold for steering and driving said tractor wheel.

4. A portable scaffold of the character described comprising a roller supported frame having a center turn-table connected thereto, a tractor wheel mounted centrally on the turn-table and adapted to engage the floor, mechanism on the scaffold for steering and driving said tractor wheel, and a platform vertically adjustable on said frame.

5. In a portable scaffold of the character described, a sub-frame having roller supports and a tractor wheel, a platform vertically adjustably mounted on said sub-frame, steering means for said tractor wheel capable of being adjusted so as to be accessible to the platform throughout its adjustments, and driving means for the tractor wheel adjustable to be accessible to the platform throughout its adjustments.

6. In a portable scaffold of the character described, a sub-frame having roller supports and a tractor wheel, a platform vertically adjustably mounted on said sub-frame, steering means for said tractor wheel capable of being adjusted so as to be accessible to the platform throughout its adjustments, and foot pedal operated driving means for the tractor wheel adjustable to be accessible to the platform throughout its adjustments.

7. In a portable scaffold, a sub-frame having roller supports, a turn-table rotatably mounted on said sub-frame, a tractor wheel carried by the turn-table, a driving element for said wheel movable with the turn-table, there being an opening in said sub-frame for the swinging movements of said element, a platform adjustably mounted above the sub-frame and having openings through which said element projects and swings, and means accessible from the platform for steering said tractor wheel.

8. In a portable scaffold, a sub-frame having roller supports, a turn-table pivotally mounted in said frame and having anti-friction bearings between it and the frame, a tractor wheel mounted on said turn-table, a ratchet wheel rotatable with said tractor wheel, a pawl bearing driving rod adapted to engage said ratchet wheel, which rod is slidably mounted in said turn-table, a platform vertically adjustable above said sub-frame, said sub-frame and scaffold having alining openings for the passage and swinging movements of said ratchet bearing element, and means to steer said tractor wheel.

9. In a portable scaffold, a sub-frame having legs provided with roller supports, a tractor wheel connected to the sub-frame, means to steer said wheel, some of said legs being pivotally connected to the frame for horizontal adjustment toward and from the other legs, bearings on said sub-frame which engage said adjustable legs when in expanded position, a platform vertically adjustable above said sub-frame and comprising a hinged section disposed above said pivotally connected legs and adapted to fold upwardly and inwardly, and mechanism accessible from the platform for driving and steering said tractor wheel.

10. In a portable scaffold of the character described, a frame having a turn-table mounted therein and provided with a tractor wheel, a pair of ratchet wheels having their teeth reversely disposed, means to rigidly connect said wheels for rotation with said tractor wheel, a driving rod for each of said ratchet wheels carrying a spring-pressed pawl adapted to engage its respective ratchet wheel, guides for said rods carried by the turn-table, a platform above the turn-table, there being an arcuate slot in said platform through which said rods project and swing, and means accessible from the platform for turning said turn-table to steer said tractor wheel.

11. In a portable scaffold, a sub-frame having roller supports and means for propelling it, a platform having supports mounted on said sub-frame, means to connect said supports to the sub-frame to vary the height of the platform, and extensible means for controlling and steering the propulsion means of the scaffold from the various operating levels of the platform.

In testimony whereof I affix my signature.

WILLIAM L. NICOLS.

Witness:
   NOMIE WELSH.